Feb. 21, 1950        J. B. THOMSON        2,498,315
CLAMPING DEVICE
Filed March 6, 1945
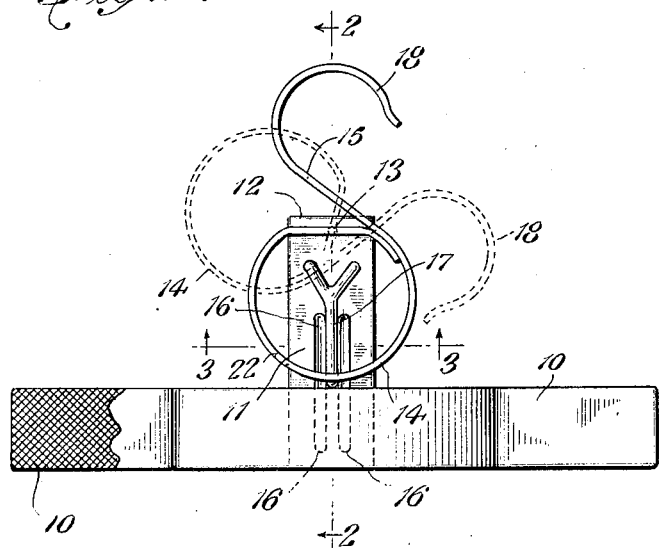
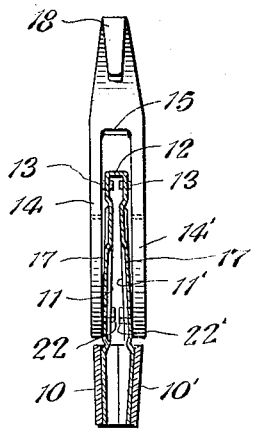
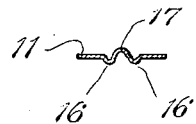
INVENTOR.
John B. Thomson
BY
Emery, Varney, Whittemore &c.
Attorneys.

Patented Feb. 21, 1950

2,498,315

UNITED STATES PATENT OFFICE 2,498,315

CLAMPING DEVICE

John B. Thomson, Plandome, N. Y.

Application March 6, 1945, Serial No. 581,302

2 Claims. (Cl. 24—250)

My invention relates to improvements in clamping devices usable for a variety of purposes and, among others, for the manufacture of trousers hangers. Its general object is to provide a device of this character which is quick and easy of application and applicable to a wide range of thicknesses of material without undue strain or distortion, and which can be made from a relatively few parts requiring only a small number of operations to manufacture and assemble.

In the drawings,

Fig. 1 is a view in front elevation partly broken away of a clamping device embodying my invention; and Figs. 2 and 3 are detail sectional views taken respectively on planes indicated by the lines 2—2 and 3—3 in Fig. 1.

Referring first to Figs. 1, 2 and 3, the clamping device there illustrated is provided with jaws 10—10' of suitable length for receiving and gripping the leg-ends of a pair of trousers in the usual manner of a trousers hanger, and a pair of supporting arms 11—11' resiliently hinged together at one end and secured at their other ends respectively to the jaws, preferably near the center of the jaws and extending substantially at right angles thereto. These supporting arms may be and preferably are stamped out of a single piece of thin strip metal which is then bent to form a hinge 12 so that the jaws will be normally held apart by the resiliency of the metal of the hinge. Embracing the supporting arms and pivoted thereto at a point 13 near the hinge of the supporting arms are a pair of curved or arcuate members, here shown as rings 14—14' adapted to swing in a plane passing through and including the jaws when closed. So pivoted, the rings, as they are swung about their pivotal support 13, move both transversely across and longitudinally along the exterior faces of the supporting arms 11, as indicated by the dotted lines in Fig. 1, and thus constitute means for controlling the opening and closing of the jaws; for when swung in one direction their longitudinal movement relative to the supporting arms will cause the jaws to close and when swung in the opposite direction will permit the jaws to spring apart. Detents 22—22' may be provided on the rings to check their movement when they have reached the full limit of their position to close the jaws.

The rings, which may also be formed from a single strip of metal of more substantial thickness than that from which the supporting arms 11 are formed, are secured to each other at the point 15 distant from their centers and near the pivot 13, and the radius of each is preferably such that when they have been swung into position to close the jaws, the lower portion of each ring will lie near the jaws as shown in Fig. 1, in which position the rings will hold the jaws tightly clamped upon any material placed between them while the resiliency of the rings, which results from the fact that they are secured together near their pivoting point only, will permit said arms 11 to spread apart to the extent necessary to accommodate various thicknesses of material between the jaws. Moreover, if the thickness of such material be excessive, the resiliency of the rings and the fact that they are located near the jaws will prevent the ends of the supporting arms 11, which are desirably made from thin strip, from being bent outwardly along their lines of contact with the rings by the counter pressure exerted by said material. The supporting arms may also be strengthened against bending by providing them with longitudinal ridges or raised portions 16 which may be produced by corrugations as shown in Fig. 3, or otherwise; and one of these ridges or raised portions 17 may be Y-shaped to provide a bearing for the arms 14, thus preventing the latter from scratching or destroying the plating with which the surfaces of the supporting arms may be provided.

Secured to the rings may be a hook 18 for supporting the device and which is so positioned in relation to the rings and their supporting pivot 13 that when the arms 14 are in position to hold the jaws together the hook 18 will be disposed directly above the supporting arms 11, whereby when the device is used as a trousers hanger and supported on said hook, the weight of the trousers will tend to keep the jaws tightly closed upon them. The hook is preferably formed integral with the rings as shown.

I claim as my invention:

1. A clamping device comprising a pair of relatively long and narrow co-acting jaws, a pair of supporting arms therefor resiliently hinged together at one end and having their other ends secured respectively to the jaws near the central portions of the jaws and substantially perpendicular thereto, and means for controlling the opening and closing of the jaws, and characterized by this: that said means comprise a pair of resilient metal rings embracing the supporting arms and being secured together at a point distant from their centers and pivoted near that point to the hinged end of said arms so as to be swingable in a plane substantially coincident with the plane of the jaws in their closed position, whereby when swung in either direction said curved members will move both transversely across and longitudinally along the exterior faces of the supporting arms.

2. A clamping device as defined in claim 1 and further characterized by this: that the supporting arms consist of a single piece of strip metal and are normally held apart by the resiliency of the metal and, that the outer faces of said arms have raised portions against which the locking arms bear in opening and closing the jaws.

JOHN B. THOMSON.

REFERENCES CITED

The following references are of record in the file of this patent:

UNITED STATES PATENTS

| Number | Name | Date |
|---|---|---|
| 847,046 | De Laughter | Mar. 12, 1907 |
| 852,951 | Harnischfeger | May 7, 1907 |
| 872,587 | Spruce | Dec. 3, 1907 |
| 900,625 | Wallis | Oct. 6, 1908 |
| 1,157,107 | Herrmann | Oct. 19, 1915 |
| 1,955,792 | Deknatel | Apr. 24, 1934 |
| 2,119,934 | Woods | June 7, 1938 |
| 2,304,343 | Diesbach | Dec. 8, 1942 |
| 2,422,845 | Niskanan | June 24, 1947 |